United States Patent
Suzuki et al.

(10) Patent No.: US 6,697,915 B2
(45) Date of Patent: Feb. 24, 2004

(54) CD-ROM DECODER

(75) Inventors: Takayuki Suzuki, Gifu (JP); Hiroyuki Tsuda, Ichinomiya (JP); Masayuki Ishibashi, Yao (JP)

(73) Assignee: Sanyo Electric Co., Ltd., Osaka (JP)

(*) Notice: Subject to any disclaimer, the term of this patent is extended or adjusted under 35 U.S.C. 154(b) by 184 days.

(21) Appl. No.: 09/818,204

(22) Filed: Mar. 27, 2001

(65) Prior Publication Data

US 2001/0027508 A1 Oct. 4, 2001

(30) Foreign Application Priority Data

Mar. 28, 2000 (JP) ........................................ 2000-088207

(51) Int. Cl.[7] .............................................. G06F 12/00
(52) U.S. Cl. ....................................................... 711/113
(58) Field of Search ..................... 711/111–113; 710/22, 710/26, 33, 34, 52, 58

(56) References Cited

U.S. PATENT DOCUMENTS

| | | | | | |
|---|---|---|---|---|---|
| 5,220,551 A | * | 6/1993 | Tateishi et al. | .......... | 369/47.45 |
| 5,553,261 A | * | 9/1996 | Hasbun et al. | .............. | 711/159 |
| 6,018,506 A | * | 1/2000 | Okabe et al. | ............ | 369/30.23 |
| 6,285,637 B1 | * | 9/2001 | Manter et al. | ............. | 369/47.1 |
| 6,324,599 B1 | * | 11/2001 | Zhou et al. | ................... | 710/22 |
| 6,523,142 B1 | * | 2/2003 | Igari et al. | .................. | 711/114 |

* cited by examiner

*Primary Examiner*—Matthew Kim
*Assistant Examiner*—Woo H. Choi
(74) *Attorney, Agent, or Firm*—Sheridan Ross PC

(57) ABSTRACT

A CD-ROM decoder for decreasing the load on a microcomputer. The CD-ROM decoder stores in a buffer memory in sector units digital data. The CD-ROM decoder includes a check head register for storing a first address of the buffer memory when storing the processed digital data in the buffer memory. A check sector counter counts the number of sectors of the processed digital data stored in the buffer memory to generate a count value. A command decision circuit decides whether digital data requested to be transferred is stored in the buffer memory based on the first address, the count value, and a head address of the digital data. The command decision circuit permits the CD-ROM decoder to transfer the processed digital data when deciding that the digital data requested to be transferred is stored in the buffer memory.

4 Claims, 5 Drawing Sheets

Fig.5
| Format | Sector Information |
|---|---|
| Mode0 | 000b |
| Mode1 | 010b |
| Mode2Formless | 011b |
| Mode2Form1 | 100b |
| Mode2Form2 | 101b |
| Other | 111b |
Fig.6
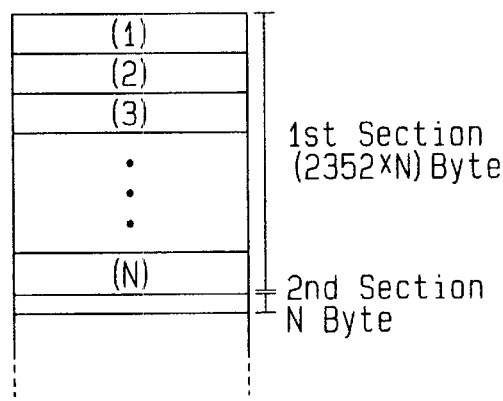
Fig.7
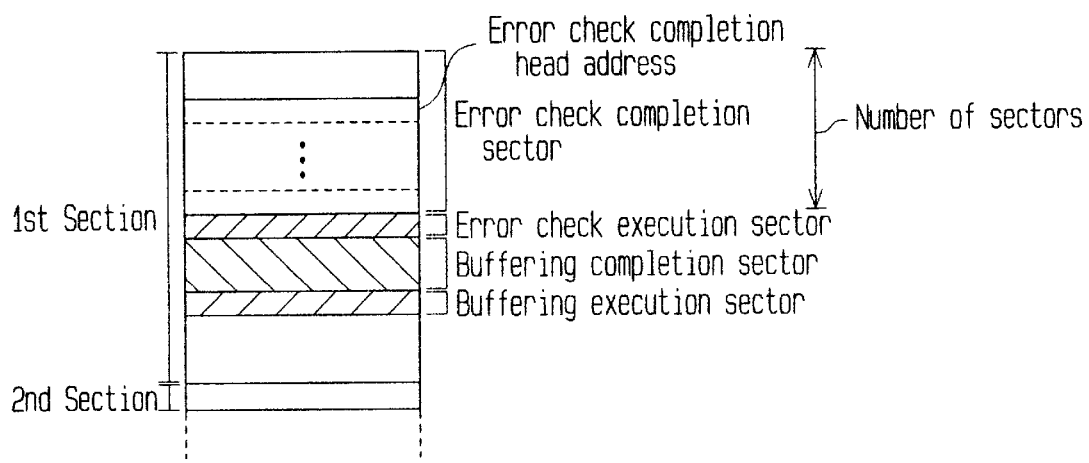

Transfer Request Command

| bit<br>byte | 7 | 6 | 5 | 4 | 3 | 2 | 1 | 0 |
|---|---|---|---|---|---|---|---|---|
| 0 | Operation code ||||||||
| 1 | 000b ||| 000b, 010b, 011b, 100b, 101b<br>Flag Bit |||| 0 | 0 |
| 2 | 00h ||||||||
| 3 | LBA (Logic Address) ||||||||
| 4 | ||||||||
| 5 | ||||||||
| 6 | TBL (Transfer Block Number) ||||||||
| 7 | ||||||||
| 8 | ||||||||
| 9 | 10h, B0h, B8h, F0h, F8h ||||||||
| 10 | 00h ||||||||
| 11 | 00h ||||||||

CD-ROM DECODER

BACKGROUD OF THE INVENTION

The present invention relates to a CD-ROM decoder, and more particularly, to a CD-ROM decoder for correcting code errors included in digital data and transferring the corrected digital data to a computer.

FIG. 1 is a schematic block diagram of a prior art CD-ROM system 100. The CD-ROM system 100 includes a pickup 2, an analog signal processor 3, a digital signal processor 4, a CD-ROM decoder 5, a buffer RAM 6, and a microcomputer 7.

A spiral record track is defined on a disc 1. Digital data complying with a predetermined format is recorded along the record track. The digital data is generated through eight to fourteen modulation (EFM). The disc 1 is rotated at a constant linear velocity or a constant angular velocity.

The pickup 2 emits a laser beam against the disc 1 and generates from the reflected laser beam a voltage signal corresponding to the digital data recorded on the disc 1.

The analog signal processor 3 shapes the waveform of the voltage signal in correspondence with the fluctuation of the voltage signal provided from the pickup 2 to generate an EFM signal.

The digital signal processor 4 performs EFM demodulation on the EFM signal provided from the analog signal processor 3 to covert the 14-bit digital data to 8-bit digital data and generates CD-ROM data. Further, the digital signal processor 4 uses a cross interleave Reed-Solomon code (CIRC) to detect and correct code errors. A frame is defined by 24 bytes of CD-ROM data. With reference to FIG. 2, a sector is defined by 2,352 (98 frames×24) bytes of CD-ROM data. A synchronization signal (12 bytes) and a header (4 bytes) are allocated to the head of each sector. The synchronization signal has a fixed pattern and indicates the head of each sector. Absolute time information (minutes/seconds/frame number: each 1 byte) and a mode identification code (1 byte) are included in the header. The absolute time information corresponds to an address on the disc 1. The mode identification code is used to identify the format (mode) of the data in a sector. In accordance with the mode and form, user data, an error correction code (ECC), and an error detection code (EDC) are allocated to the 2,336 bytes following the header. For example, referring to FIG. 3, in mode 1, the user data (2,048 bytes), the EDC (4 bytes), ZERO (8 bytes), and the ECC (276 bytes) follow the header. In mode 2, formless, only the user data (2,336 bytes) follows the header. In form 1 of mode 2, a sub-header (8 bytes), user data (2,048 bytes), the EDC (4 bytes), and the ECC (276 bytes) follow the header. In form 2 of mode 2, the sub-header (8 bytes), the user data (2,334 bytes), and the EDC (4 bytes) follow the header.

The CD-ROM decoder 5 also corrects error codes included in the CD-ROM data provided from the digital signal processor 4 and transfers CD-ROM data (user data) to a host computer based on a request from the host computer.

The buffer RAM 6 is connected to the CD-ROM decoder 5 to store CD-ROM data in sector units for a predetermined time. The CD-ROM decoder 5 performs decoding to correct code errors in the CD-ROM data during the predetermined time.

The microcomputer 7 executes a predetermined control program so that the analog signal processor 3, the digital signal processor 4, and the CD-ROM decoder 5 are operated at predetermined timings. In response to a transfer request of the CD-ROM data from the host computer, the microcomputer 7 controls the analog signal processor 3, the digital signal processor 4, and the CD-ROM decoder 5 to transfer the requested data to the host computer.

Normally, the transfer of CD-ROM data is requested continuously. Thus, the CD-ROM data of the disc 1 is stored in the buffer RAM 6 prior to the transfer request (hereafter referred to as data pre-read). When the microcomputer 7 receives a data transfer request from a host computer, the microcomputer 7 first decides whether the transfer data has been stored in the buffer RAM 6. If the transfer data has been stored in the buffer RAM 6, the microcomputer 7 transfers the transfer data to the host computer from the CD-ROM decoder 5. If the transfer data has not yet been stored in the buffer RAM 6, the microcomputer 7 activates the pickup 2 to read the transfer data.

Accordingly, in the CD-ROM system 100, the decision of whether the transfer data has been stored (the checking of pre-read data) when the host computer request the transfer of CD-ROM data is performed by the microcomputer 7. Further, the processes described above, including the checking of the pre-read data are properly performed in accordance with a control program. However, an increase in the operating speed of the CD-ROM system 100 increases the load on the microcomputer 7. As a result, the microcomputer 7 may not be able to follow the operations of the analog signal processor 3, the digital signal processor 4, and the CD-ROM decoder 5.

SUMMARY OF THE INVENTION

It is an object of the present invention to provide a CD-ROM decoder that decreases the load on the microcomputer, while appropriately performing data transfer control.

To achieve the above object, the present invention provides a CD-ROM decoder for temporarily storing in a buffer memory in sector units digital data having a predetermined number of bytes and a predetermined format, processing the digital data by correcting and detecting code errors included in the digital data, and transferring the processed digital data. The CD-ROM decoder includes a check head register for storing a first address of the buffer memory when the storing of the processed digital data to the buffer memory is started. A check sector counter counts the number of sectors of the processed digital data stored in the buffer memory to generate a count value. A command decision circuit connected to the check head register and the check sector for deciding whether the digital data requested to be transferred is stored in the buffer memory based on the first address, the count value, and a head address of the digital data requested to be transferred. The command decision circuit permits the CD-ROM decoder to transfer the processed digital data when deciding that the digital data requested to be transferred is stored in the buffer memory.

The present invention further provides a method for transferring in sector units digital data having a predetermined number of bytes and a predetermined format with a CD-ROM decoder. The CD-ROM decoder includes a command decision circuit for deciding whether data requested to be transferred is stored in a buffer memory. The method includes temporarily storing the digital data in the buffer memory, processing the digital data by correcting and detecting code errors included in the digital data to generate processed digital data, storing a first address of the buffer memory when the storing of the processed digital data to the buffer memory is started, and counting the number of sectors of the processed digital data stored in the buffer memory to generate a count value. The count value corresponds to an address interval of the processed digital data occupying the buffer memory. The method further includes deciding whether the digital data requested to be transferred is stored in the buffer memory with the command decision circuit by comparing a comparison address decided from the first address and the address interval to a head address of the digital data requested to be transferred, and permitting the CD-ROM decoder to transfer the processed digital data with the command decision circuit when the digital data requested to be transferred is decided to be stored in the buffer memory.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a table showing the relationship between the sector format and sector information;

FIG. 6 is a schematic diagram illustrating a memory area of a buffer RAM;

FIG. 7 is a diagram illustrating a memory area of a sector of the buffer RAM;

DETAILED DESCRIPTION OF THE PREFERRED EMBODIMENTS

Figure 1:
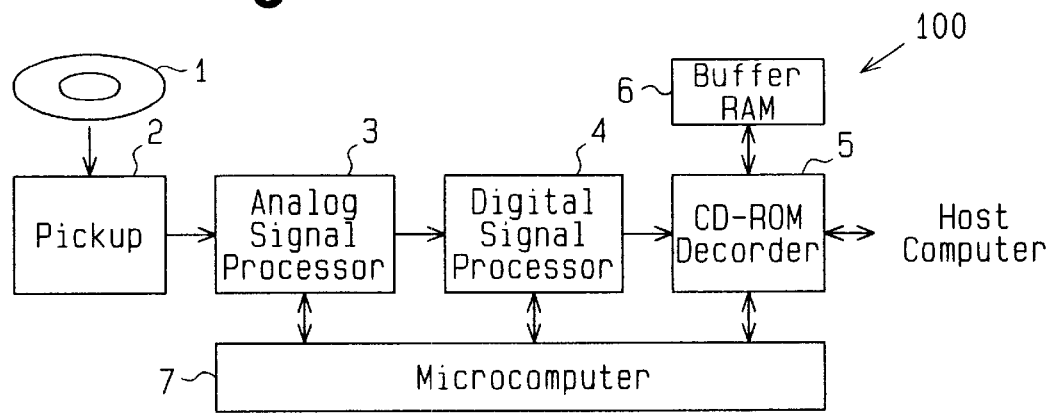
FIG. 1 is a schematic block diagram of a prior art CD-ROM system.
Figure 2:
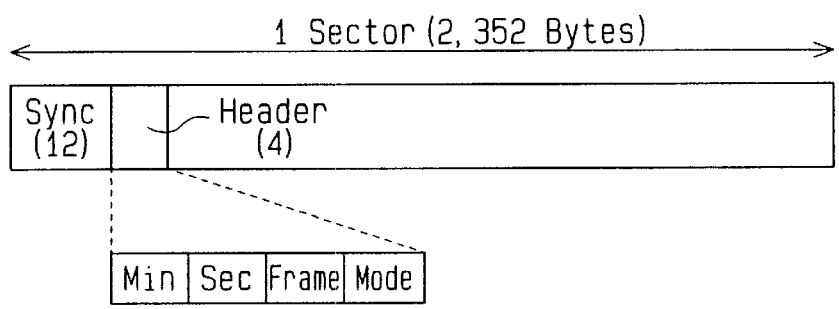
FIG. 2 is a diagram illustrating the structure of a sector of CD-ROM data.
Figure 3:
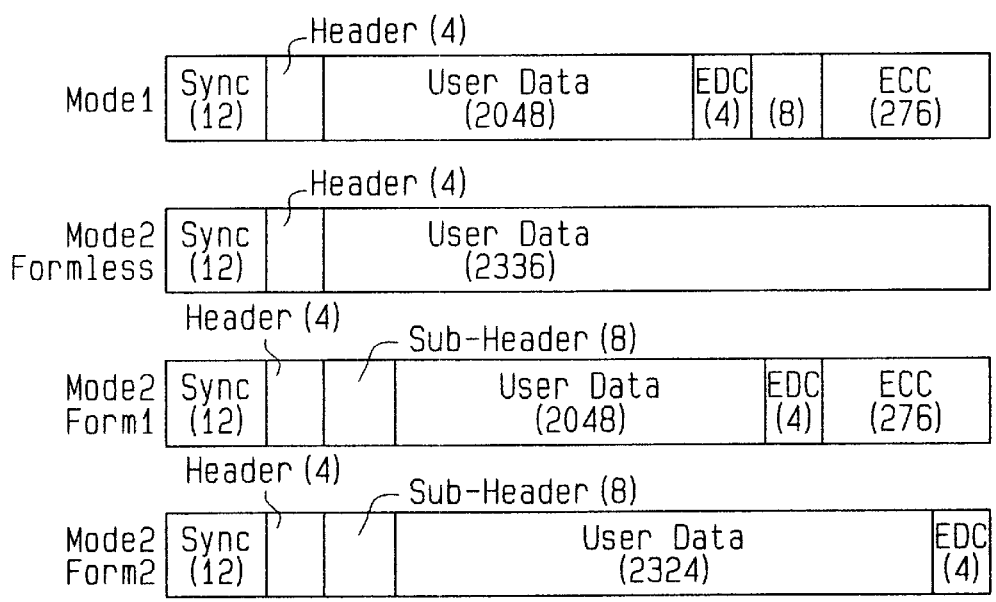
FIG. 3 is a diagram illustrating formats of a sector of CD-ROM data.

In the drawings, like numerals are used for like elements throughout.

Figure 4A:
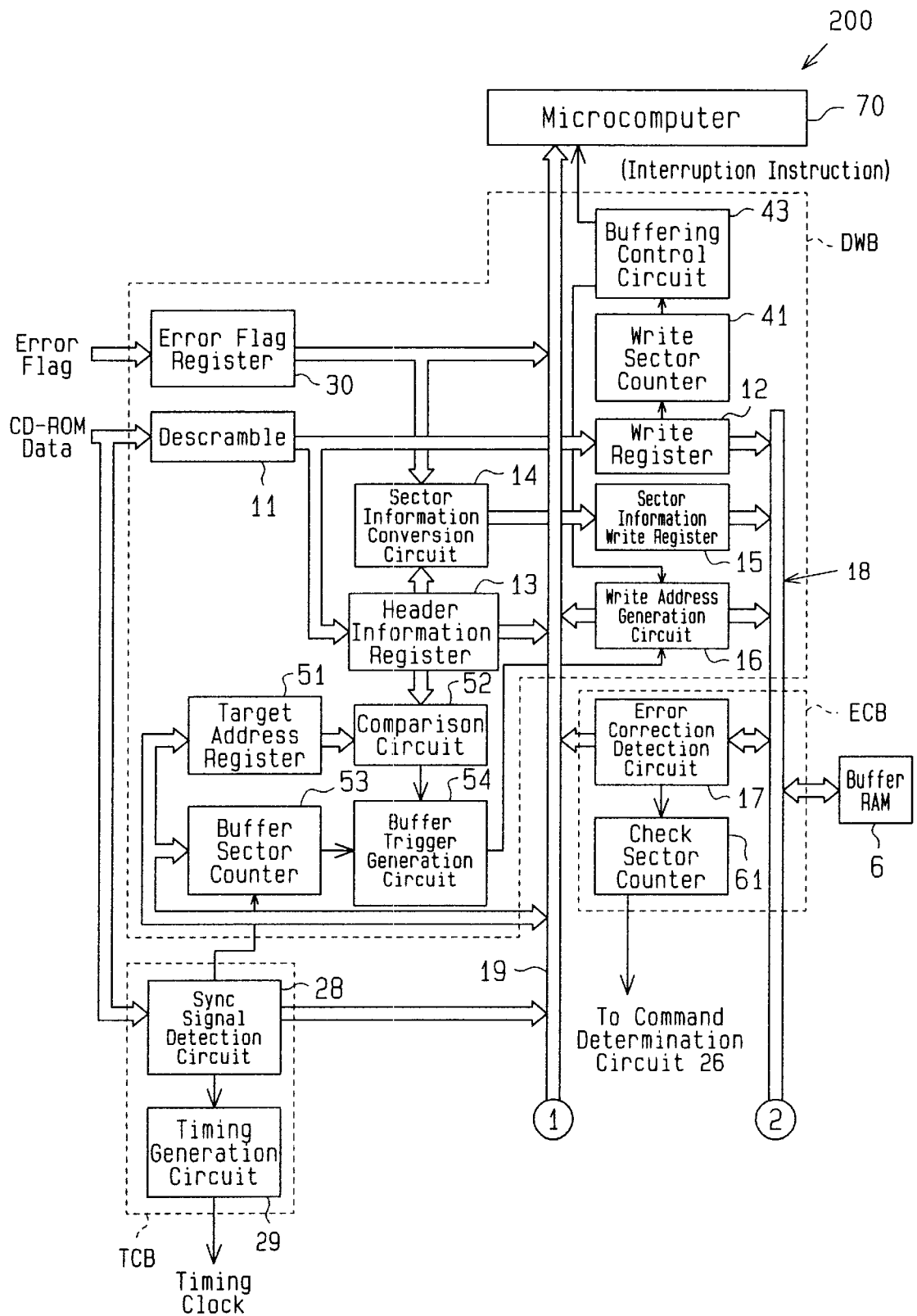
FIG. 4A and FIG. 4B are schematic block diagrams of a CD-ROM decoder according to a preferred embodiment of the present invention.
Figure 4B:
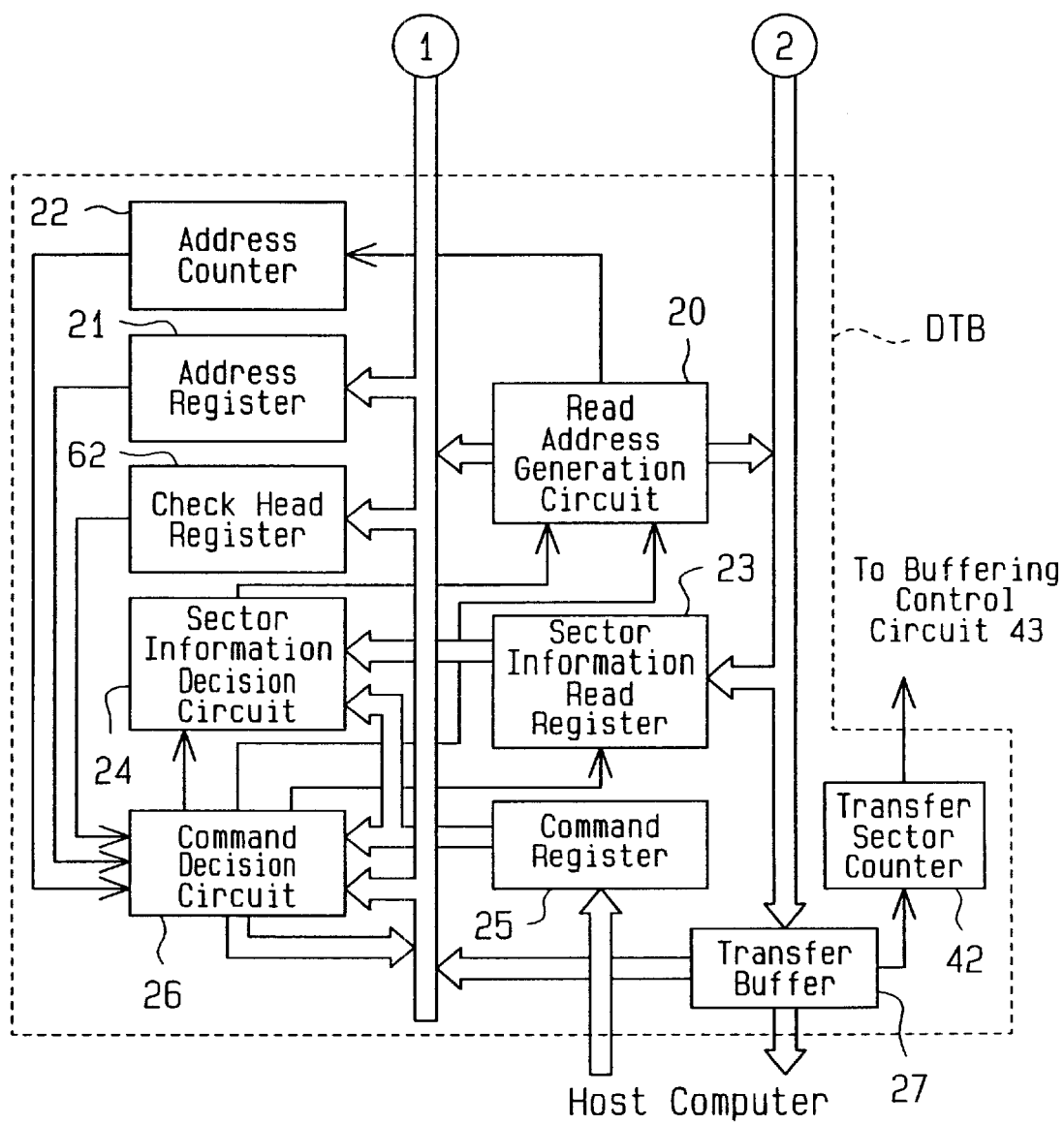

FIGS. 4A and 4B show a CD-ROM decoder 200 according to a first embodiment of the present invention. The CD-ROM decoder 200 is used in lieu of the CD-ROM decoder 5 of FIG. 1 and connected to the buffer RAM 6 and a microcomputer 70.

The CD-ROM decoder 200 includes a data write circuit DWB, an error check circuit ECB, a data transfer circuit DTB, and a timing adjustment circuit TCB. The data write circuit DWB stores CD-ROM data in the buffer RAM 6. The error check circuit ECB detects and corrects write data errors. The data transfer circuit DTB transfers the data stored in the buffer RAM 6 to a host computer. The timing adjustment circuit TCB adjusts the timing of the data write circuit DWB, the error check circuit ECB, and the data transfer circuit DTB.

The data write circuit DWB includes a descramble circuit 11, a write register 12, a header information register 13, a sector information conversion circuit 14, a sector information write register 15, a write address generation circuit 16, an error flag register 30, a write sector counter 41, a buffering control circuit 43, a target address register 51, a comparison circuit 52, a buffer sector counter 53, and a buffer trigger generation circuit 54.

Except for the 12 bytes of the synchronization signal, the descramble circuit 11 descrambles the 2,340 bytes of data in each sector of CD-ROM data. The descramble circuit 11 then generates descrambled CD-ROM data having a predetermined format.

The write register 12 receives CD-ROM data from the descramble circuit 11 and writes the CD-ROM data to the buffer RAM 6 via a first data bus 18. The write register 12 is connected to the write sector counter 41. The write sector counter 41 counts the number of sectors in the CD-ROM data written to the buffer RAM 6 and provides a count value CB to the buffering control circuit 43.

The buffering control circuit 43 performs buffering management based on the count value CB and a count value CT of a transfer sector counter 42.

The header information register 13 extracts 4-byte header information from the CD-ROM data provided by the descramble circuit 11 and transfers the header information to the microcomputer 70 via a second data bus 19. The header information register 13 extracts 8 bytes of data following the header as a sub-header and provides the header and the sub-header to the sector information conversion circuit 14.

The sector information conversion circuit 14 decides the mode of the CD-ROM data based on the header information. When the CD-ROM data is in mode 2, the sector information conversion circuit 14 decides the form based on the sub-header information. In accordance with the decision result, the sector information conversion circuit 14 generates 3 bits of sector information indicating the format of the CD-ROM data in each sector and provides the sector information to the sector information write register 15. FIG. 5 shows the relationship between the format of each sector and the 3-bit selector information.

The sector information write register 15 receives the sector information from the sector information conversion circuit 14 and writes the sector information to the buffer RAM 6 via the first data bus 18.

The buffer RAM 6 has sufficient capacity for storing CD-ROM data having a predetermined number of sectors to transfer data to the host computer. Referring to FIG. 6, the buffer RAM 6 has first sections, which store 2,352×N bytes of CD-ROM data, and second sections following the associated first sections to store N bytes of sector information. This associates the CD-ROM data and the sector information (the format information of data) in sector units in the buffer RAM 6.

The write address generation circuit 16 generates an address designating the area for a sector in one of the first sections of the buffer RAM 6 and designates a write address in the buffer RAM 6 for the CD-ROM data stored in the write register 12. The write address, which includes an address corresponding to data at the head of a sector, is provided from the write address generation circuit 16 to an address register 21 via the second data bus 19. Simultaneously, the write address generation circuit 16 generates an address designating an area having one byte in the second sections of the buffer RAM 6 and designates the write address for writing the sector information stored in the sector information write register 15 to the buffer RAM 6. The sector information write address is provided to the address register 21.

The error flag register 30 receives an error flag indicating that an error was not corrected during the error correction process and transfers the error flag to the microcomputer 70 via the second data bus 19. The error flag of the sub-header is provided to the sector information conversion circuit 14.

A target address register 51 stores target address information provided from a microcomputer 70 via the second data bus 19 and repetitively provides the target address information to the comparison circuit 52. The target address information indicates the address of the sector at the head of the CD-ROM data requested from the host computer and is generated by the microcomputer 70 in response to an instruction from the host computer.

The comparison circuit 52 compares the target address information provided from the target address register 51 with the data address information provided from a header information register 13 to generate a buffering start pulse signal when the two pieces of information match.

The buffer sector counter 53 receives buffering sector information from the microcomputer 70 as preset data. The buffering sector information indicates the number of sectors that are to be buffered (transferred) and is generated in response to an instruction from the host computer. The buffer sector counter 53 counts downward whenever a sector of the CD-ROM data is provided in response to a timing signal, which is provided by a synchronization signal detection circuit 28. When the count value returns to an initial value (zero), the buffer sector counter 53 generates a buffering stop pulse signal.

The buffer trigger generation circuit 54 instructs the buffering to be started when the buffering start pulse signal goes high. Further, the buffer trigger generation circuit 54 instructs the buffering to be stopped when the buffering stop pulse signal goes high.

The target address register 51, the comparison circuit 52, the buffer sector counter 53, and the buffer trigger generation circuit 54 automatically start and stop buffering in response to a transfer request from a host computer.

The error check circuit ECB includes an error correction detection circuit 17 and a check sector counter 61.

The error correction detection circuit 17 corrects and detects errors in the CD-ROM data written to the buffer RAM 6. The error correction detection circuit 17 receives the CD-ROM data and sector information in single sector units from the buffer RAM 6, decides the process to be carried out on the CD-ROM data based on the sector information, corrects code errors with the ECC, and detects code errors with the EDC. For example, if the sector information is in mode 1 or in form 1 of mode 2, error correction and error detection are performed. If the sector information is form 2 of mode 2, only error detection is performed. The CD-ROM data that has undergone a predetermined process is stored again in the buffer RAM 6 to be transferred to the host computer. The error correction detection circuit 17 provides the check sector counter 61 with a timing signal in sector units whenever the error checking is completed. Further, the error correction detection circuit 17 provides the check head register 62 with an address (first address) CTA (FIG. 7) of a head selector, which has been checked for errors and has been stored in the buffer RAM 6.

In response to a timing signal, the check sector counter 61 counts the number CSN of sectors that have undergone a predetermined error check in the error correction detection circuit 17 and provides the count value to a command decision circuit 26.

The data transfer circuit DTB includes a read address generation circuit 20, the address register 21, an address counter 22, a sector information read register 23, a sector information decision circuit 24, a command register 25, the command decision circuit 26, a transfer buffer 27, and the check head register 62. The read address generation circuit 20, the address register 21, the sector information decision circuit 24, and the command decision circuit 26 configure a data transfer circuit. The data transfer circuit checks the flag bit of the transfer request command stored in the command register 25 and decides the data transfer byte number per sector and transfers data in correspondence with the data transfer byte number to the host computer.

In response to instructions from the sector information decision circuit 24 and the command decision circuit 26, the read address generation circuit 20 generates addresses designating the first and second sections of the buffer RAM 6. Based on the address, the sector information and the CD-ROM data (user data) are read from the buffer RAM 6. The read sector information is temporarily stored in the sector information read register 23. The read user data is provided to the transfer buffer 27 via the first data bus 18, and the user data is transferred to the host computer from the transfer buffer 27.

The address register 21 receives from the write address generation circuit 16 the write address corresponding to the data at the head of each sector and the write address corresponding to the sector information. Simultaneously, among the plural pieces of sector time information stored in the buffer RAM 6, the address register 21 stores the smallest piece of time information or the largest piece of time information. This enables recognition of the time information of all of the sectors stored in the buffer RAM 6.

The address counter 22 increments its count value each time the read address generation circuit 20 updates the read address and provides the count value to the command decision circuit 26. The address counter 22 is operated when the read address generation circuit 20 provides the read address to the buffer RAM 6 and counts the sector number (or the byte number) of the data read from the buffer RAM 6.

The check head register 62 stores the address CTA of the head sector checked by the error correction detection circuit 17 and stored in the buffer RAM 6.

The sector information decision circuit 24 decides the format of the CD-ROM data of the sector corresponding to the sector information based on the sector information stored in the sector information read register 23. The sector information decision circuit 24 sets an offset value added to the read address by the read address generation circuit 20 in accordance with the format of the CD-ROM data when transferring data to the host computer. In other words, user data excluding the header and the sub-header is transferred to the host computer. Thus, in accordance with the format of each sector, the addresses of the header and the sub-header are added to the head address as an offset value. When all of the CD-ROM data (2,352 bytes) in a sector is transferred, offsetting is not necessary. The command decision circuit 26 decides whether offsetting is necessary based on the instruction from the host computer.

Figures 8, 9:
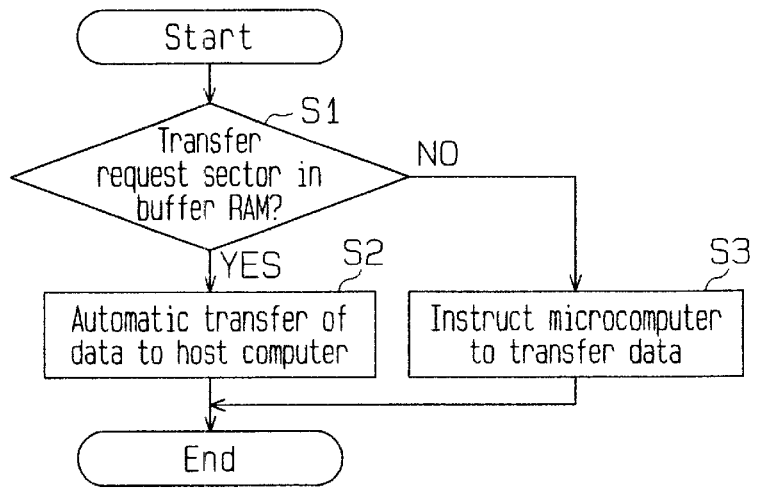
FIG. 8 is a diagram illustrating the structure of a transfer request command.
FIG. 9 is a flowchart illustrating the recognition of pre-read data by the CD-ROM decoder of FIGS. 4A and 4B.

The command register 25 temporarily stores the transfer request command provided from the host computer. Referring to FIG. 8, the transfer request command includes 12 bytes. The flag bit indicating the format of the sector is set in the second, third, and fourth bits of the first byte. A logic address LBA of the head sector of the transfer request data is set in the third, fourth, and fifth bytes. The transfer request sector number (transfer block number) TBL is set in the sixth, seventh, and eighth bytes. The command register 25 stores a transfer request head sector address DTA (LBA) and a transfer request block (sector) number TBL, which are transfer parameters. Further, the command register 25 provides the transfer request head sector address DTA and the transfer request sector number TBL to the command decision circuit 26.

The command decision circuit 26 decides whether the data requested to be transferred has been stored in the buffer RAM 6 based on the address information stored in the address register 21 and the transfer request command stored in the command register 25. Based on the information of the check sector counter 61 and the check head register 62, the command decision circuit 26 decides whether the data corresponding to the transfer request of the host computer has been checked for errors and stored in the buffer RAM 6. The command decision circuit 26 sends operating instructions to the read address generation circuit 20 and the sector information read register 23 when the transfer request data is stored in the buffer RAM 6 to automatically transfer data to the host computer. That is, the command decision circuit 26 checks the pre-read data.

The transfer buffer 27 receives user data read from the buffer RAM 6 via the first data bus 18 and transfers the user data to the host computer. The transfer buffer 27 is connected to the transfer sector counter 42. The transfer sector counter 42 counts the sector number of the user data transferred to the host computer and provides the count value CT to the buffering control circuit 43.

The timing adjustment circuit TCB includes the synchronization signal detection circuit 28 and a timing generation circuit 29. The synchronization signal detection circuit 28 detects 12 bytes of the synchronization signal at the head of each sector of the CD-ROM data and provides the timing generation circuit 29 with a timing signal indicating the beginning of a sector. The synchronization signal detection circuit 28 provides error detection data to the microcomputer 70 via the second data bus 19 when the synchronization signal is not detected.

The timing generation circuit 29 receives the timing signal from the synchronization signal detection circuit 28 and generates various timing clock signals for deciding the operating timing of the microcomputer 70, the data write circuit DWB, the error check circuit ECB, and the data transfer circuit DTB.

In the CD-ROM decoder 200, the data write circuit DWB and the data transfer circuit DTB are operated in accordance with the timing clock signal, the flag bit of the transfer request command from the host computer is recognized, and the transfer byte number per sector is decided from the format of the transfer sector. Accordingly, the transfer of CD-ROM data is performed automatically and not controlled by the microcomputer 70.

The automatic transfer processing performed by the CD-ROM decoder 200 will now be discussed.

The command decision circuit 26 refers to the address and time information stored in the address register 21 or the check head register 62 and decides whether the requested sector (target sector) is stored in the buffer RAM 6. If the target sector is stored in the buffer RAM 6, the command decision circuit 26 instructs the read address generation circuit 20 to generate an address for reading the sector information from the buffer RAM 6. Based on the address of the read address generation circuit 20, the sector information of the target sector is read from the buffer RAM 6 and the sector information is stored in the sector information read register 23. The sector information decision circuit 24 recognizes the format of the target sector based on the sector information.

When the host computer requests for the transfer of only user data from the host computer, the sector information decision circuit 24 generates offset information based on the format.

The read address generation circuit 20 adds the offset information to the head address of the read sector to generate an address signal and provide the address signal to the buffer RAM 6 to read the user data of the target sector from the buffer RAM 6. For example, if the target sector is in mode 1, the user data of the target sector is read from the address obtained by adding the 12 byes of the synchronization signal and the 4 bytes of the header to the head address stored in the address register 21. The number of transfer bytes per sector is automatically recognized in this manner in accordance with the format of each sector.

When the reading of the user data starts, the address counter 22 counts the byte number of user data read from the buffer RAM 6. When the byte number of the read user data reaches the byte number instructed by the host computer, the command decision circuit 26 instructs the read address generation circuit 20 to stop reading data.

In this manner, the data stored in the buffer RAM 6 is automatically transferred to the host computer without being controlled by the microcomputer.

If the command decision circuit 26 decides that the CD-ROM data of the target sector is not stored in the buffer RAM 6, the command decision circuit 26 sends a new CD-ROM data read (buffering) instruction to the microcomputer 70 via the second data bus 19. Based on the instruction, the microcomputer 70 activates the pickup 2 and reads the CD-ROM data of multiple sectors including the target sector from the disc 1. When the CD-ROM data including the target sector is stored in the buffer RAM 6, the above automatic transfer process is performed.

The checking of the pre-read data by the command decision circuit 26 will now be discussed with reference to the flowchart of FIG. 9. The command decision circuit 26 includes known logic circuits, such as a comparison circuit (not shown) for comparing data or an adding circuit for adding data (not shown).

At step S1, the command decision circuit 26 decides whether the transfer request (target) sector has been stored in the buffer RAM 6 based on the information from the address register 21, the transfer request head sector address DTA stored in the command register 25, and the transfer request sector number TBL (transfer parameter) stored in the command register 25.

The command decision circuit 26 compares the error check completion head address (first address) CTA and the transfer request head sector address DTA to decide whether the target sector (data) has been checked for errors and has been stored in the buffer RAM 6. More specifically, the command decision circuit 26 adds an address, which is based on the count value CSN of the check sector counter 61, to the first address CTA to generate a comparison address. The count value CSN corresponds to an address interval of the error checked sectors (processed digital data) occupying the buffer memory. The command decision circuit 26 decides whether the value of the transfer request head sector address DTA is equal to or lower than that of the comparison address. If the transfer request head sector address DTA is equal to or lower than the comparison address, the command decision circuit 26 decides that the target sector has been checked for errors and has been stored in the buffer RAM 6. During the address comparison, the error check completion head address CTA is converted to the CD-ROM logic address (LBA).

At step S1, the command decision circuit 26 decides whether the target sector has been checked for errors and has been stored in the buffer RAM 6. If the target sector has been checked and stored, the command decision circuit 26 proceeds to step S2 and performs the automatic transfer operation as described above.

If the command decision circuit 26 decides that the target sector is not stored in the buffer RAM 6, the command decision circuit 26 proceeds to step S3 and sends an instruction to the microcomputer 70 to store (buffer) new CD-ROM data in the buffer RAM 6.

The advantages of the CD-ROM decoder 200 according to the preferred and illustrated embodiment are discussed below.

(1) The command decision circuit 26 checks whether the transfer request data (sector) is stored in the buffer RAM 6. In the prior art, this was performed by the microcomputer 7. Further, if the transfer request sector is in the buffer RAM 6, the sector information decision circuit 24 and the command decision circuit 26 recognizes the transfer data byte number per sector and transfers the data to the host computer. Thus, the load on the microcomputer 70 decreases and the speed and number of transferred bytes in the microcomputer 70 increase.

(2) Since the flag bit of the transfer request command is automatically recognized, the time period from when the CD-ROM decoder 200 receives a command to when data is transferred to the host computer is shortened. This improves the performance of the decoder 200.

(3) The sector information is temporarily stored in the buffer RAM 6. Thus, the CD-ROM decider 200 does not require a means for storing sector information. The sector information is temporarily stored in the buffer memory 6 with the CD-ROM data. Thus, sector information is properly processed in association with the CD-ROM data.

It should be apparent to those skilled in the art that the present invention may be embodied in many other specific forms without departing from the spirit or scope of the invention. Particularly, it should be understood that the present invention may be embodied in the following forms.

The transfer request command (transfer command) may be provided to the command decision circuit 26 via the computer 70 from the host computer. In this case, the load on the microcomputer 70 due to the checking of the pre-read data by the microcomputer 70 is decreased. Further, the automatic transfer of the transfer request data may be applicable to various types of host computers.

The sector information write register 15 need not be provided. For example, the sector information may be transferred from the sector information conversion circuit 14 to the microcomputer 70. Alternatively, a memory may be provided to store the sector information. Such configurations also reduce the load resulting from the transfer of CD-ROM data in the microcomputer 70.

The present examples and embodiments are to be considered as illustrative and not restrictive, and the invention is not to be limited to the details given herein, but may be modified within the scope and equivalence of the appended claims.

What is claimed is:

1. A CD-ROM decoder for temporarily storing in a buffer memory in sector units digital data having a predetermined number of bytes and a predetermined format, processing the digital data by correcting and detecting code errors included in the digital data, and transferring the processed digital data, wherein the digital data includes header information and sub-header information, the CD-ROM decoder comprising:

a check head register for storing a first address of the buffer memory when the storing of the processed digital data to the buffer memory is started;

a check sector counter for counting the number of sectors of the processed digital data stored in the buffer memory to generate a count value;

a command decision circuit connected to the check head register and the check sector counter for deciding whether the digital data requested to be transferred is stored in the buffer memory based on the first address, the count value, and a head address of the digital data requested to be transferred, wherein the command decision circuit permits the CD-ROM decoder to transfer the processed digital data when deciding that the digital data requested to be transferred is stored in the buffer memory;

a header information register for storing the header information and the sub-header information;

a sector information conversion circuit connected to the header information register for deciding the format of the digital data in each sector based on the header information and the sub-header information and generating sector information indicating the decided format, wherein the sector information conversion circuit temporarily stores the sector information in the buffer memory in association with the digital data;

a command register connected to the command decision circuit for storing a data transfer request command including format information of the data requested to be transferred; and a sector information decision circuit for receiving the sector information from the buffer memory and the transfer request command from the command register and comparing the sector information to the format information of the transfer request command, wherein the sector information decision circuit decides a transfer byte number of the processed digital data that is to be transferred per sector based on the format information when the sector information and the format information match.

2. The CD-ROM decoder according to claim 1, wherein the count value corresponds to an address interval of the processed digital data occupying the buffer memory, and wherein the command decision circuit adds the address interval to the first address to generate a comparison address and decides whether the digital data requested to be transferred is stored in the buffer memory by comparing the comparison address and the head address of the digital data that is requested to be transferred.

3. The CD-ROM decoder according to claim 2, further comprising:

a command register connected to the command decision circuit for storing a data transfer request command that includes address information, wherein the command decision circuit decides the head address of the digital data requested to be transferred based on the address information.

4. The CD-ROM decoder according to claim 2, wherein the command decision circuit decides the head address of the digital data that is requested to be transferred based on address information received from an external microcomputer.

* * * * *